(12) United States Patent
Bookbinder et al.

(10) Patent No.: US 10,444,427 B2
(45) Date of Patent: Oct. 15, 2019

(54) SINGLE MODE OPTICAL FIBER WITH CHLORINE DOPED CORE AND LOW BEND LOSS

(71) Applicant: Corning Incorporated, Corning, NY (US)

(72) Inventors: Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/660,024

(22) Filed: Jul. 26, 2017

(65) Prior Publication Data

US 2018/0031762 A1    Feb. 1, 2018

Related U.S. Application Data

(60) Provisional application No. 62/368,712, filed on Jul. 29, 2016.

(51) Int. Cl.
*G02B 6/036* (2006.01)
*G02B 6/02* (2006.01)
(Continued)

(52) U.S. Cl.
CPC ..... *G02B 6/02276* (2013.01); *G02B 6/02009* (2013.01); *G02B 6/0286* (2013.01);
(Continued)

(58) Field of Classification Search
CPC .......... G02B 6/036; G02B 6/03616; G02B 6/02276; G02B 6/02009; G02B 6/4478;
(Continued)

(56) References Cited

U.S. PATENT DOCUMENTS

| 6,959,137 B2* | 10/2005 | Kalish | G02B 6/02009 385/123 |
| 7,440,663 B2* | 10/2008 | Matsuo | G02B 6/02266 385/123 |

(Continued)

OTHER PUBLICATIONS

International Search Report and Written Opinion PCT/US2017/043020 dated Oct. 12, 2017.

(Continued)

*Primary Examiner* — Chris H Chu
(74) *Attorney, Agent, or Firm* — Smit Kapadia; Svetlana Z. Short

(57) ABSTRACT

Single mode optical fibers with a chlorine doped core and a cladding having a fluorine doped trench region are disclosed. The optical fiber includes a chlorine doped silica core having a core alpha $\alpha \geq 10$, a core radius $r_1$ and maximum refractive index delta $\Delta_{1max}$ % and a Cl concentration $\geq 0.9$ wt %. The optical fiber also has a cladding surrounding the core, the cladding having an inner and an outer cladding. The inner cladding has first and second cladding regions. The optical fiber has mode field diameter at 1310 nm of larger than 9 microns, a cable cutoff wavelength of $\leq 1260$ nm, a zero dispersion wavelength $\lambda_0$, where 1300 nm$\leq \lambda_0 \leq 1324$ nm, and bend loss at 1550 nm for a 20 mm mandrel of less than 0.5 dB/turn.

20 Claims, 4 Drawing Sheets

(51) Int. Cl.
*G02B 6/44* (2006.01)
*G02B 6/028* (2006.01)

(52) U.S. Cl.
CPC ..... *G02B 6/03616* (2013.01); *G02B 6/03644* (2013.01); *G02B 6/03666* (2013.01); *G02B 6/4478* (2013.01)

(58) Field of Classification Search
CPC .............. G02B 6/0286; G02B 6/03644; G02B 6/03666
See application file for complete search history.

(56) References Cited

U.S. PATENT DOCUMENTS

| | | |
|---|---|---|
| 7,676,129 B1 | 3/2010 | Bookbinder et al. |
| 7,773,848 B2 | 8/2010 | Bookbinder et al. |
| 7,903,917 B2 | 3/2011 | Bickham et al. |
| 8,542,969 B2 | 9/2013 | Bookbinder et al. |
| 8,588,569 B2 | 11/2013 | Bookbinder et al. |
| 8,666,214 B2 | 3/2014 | Bookbinder et al. |
| 8,849,082 B2 | 9/2014 | Bookbinder et al. |
| 8,891,925 B2 | 11/2014 | Bickham et al. |
| 8,953,917 B2 | 2/2015 | Berkey et al. |
| 2003/0174988 A1 | 9/2003 | Bickham et al. |
| 2004/0151455 A1 | 8/2004 | Nagayama et al. |
| 2009/0052853 A1* | 2/2009 | Mukasa ............ C03B 37/02781 385/125 |
| 2010/0002997 A1* | 1/2010 | Gruner-Nielsen ........................... G02B 6/02261 385/95 |
| 2014/0369639 A1 | 12/2014 | Zhang et al. |
| 2016/0131832 A1 | 5/2016 | Haruna et al. |

OTHER PUBLICATIONS

International Search Report and Written Opinion PCT/US2017/044160 dated Oct. 11, 2017.

* cited by examiner

SINGLE MODE OPTICAL FIBER WITH CHLORINE DOPED CORE AND LOW BEND LOSS

This application claims the benefit of priority under 35 U.S.C. § 119 of U.S. Provisional Application Ser. No. 62/368,712, filed on Jul. 29, 2016, the content of which is relied upon and incorporated herein by reference in its entirety.

BACKGROUND

The disclosure relates generally to single mode optical fibers with low bend loss, and in particular relates top optical fibers with chlorine doped cores, and more particularly to single mode fibers with chlorine doped cores and a cladding having a fluorine doped trench region.

No admission is made that any reference cited herein constitutes prior art. Applicant expressly reserves the right to challenge the accuracy and pertinence of any cited documents.

SUMMARY

Low attenuation is important property for optical fibers used for communications applications. The optical fibers disclosed herein are particularly useful as low attenuation optical fibers in optical fiber cables for submarine and terrestrial long haul systems.

An embodiment of the disclosure is an optical fiber comprising:
a) a chlorine doped silica core having a core alpha $\alpha \geq 10$, a core radius $r_1$ and maximum refractive index delta $\Delta_{1max}$ % and Cl concentration$\geq 0.9$ wt %;
b) a cladding surrounding the core, the cladding comprising:
   a. an inner cladding region immediately surrounding the core and comprising first and second cladding regions with respective outer radii $r_{2a}$ and $r_2$ where $r_{2a} < r_2$, the second cladding region comprising a refractive index delta $\Delta_2$ with a minimum refractive index delta $\Delta_{2min}$ at radius $r_{2a}$ and maximum refractive index delta $\Delta_{2max}$ at radius $r_2$ such that $\Delta_{2min} < \Delta_{2max} < \Delta_{1max}$, and comprising an index slope $TS = (\Delta_{2max} - \Delta_{2min})/(r_2 - r_1) > 0$;
   b. an outer cladding region surrounding the first inner cladding region and comprising an outer radius $r_{max}$ and refractive index delta $\Delta_5$, such that $\Delta_2 < \Delta_5 < \Delta_{2max}$; and
c) wherein the optical fiber has mode field diameter MFD at 1310 nm of larger than 9 microns, a cable cutoff wavelength of $\leq 1260$ nm, zero dispersion wavelength $\lambda_0$, where 1300 nm$\leq \lambda_0 \leq 1324$ nm and bend loss at 1550 nm for a 20 mm mandrel of less than 0.5 dB/turn.

Another embodiment of the disclosure is the optical fiber described above, where the first cladding region comprises fluorine doped silica.

Another embodiment of the disclosure is the optical fiber described above, wherein the first cladding region consists essentially of fluorine doped silica and chlorine doped silica.

Another embodiment of the disclosure is the optical fiber described above, wherein the cladding further comprises a third cladding region immediately surrounding the second cladding region and comprising a refractive index delta $\Delta_3$ and a maximum refractive index delta $\Delta_{3max}$ such that $\Delta_5 < \Delta_{3max}$.

Another embodiment of the disclosure is the optical fiber described above, wherein the cladding further comprises a fourth cladding region immediately surrounding the third cladding region and comprising a refractive index delta $\Delta_4$ and a minimum refractive index delta $\Delta_4$ such that $\Delta_4 < \Delta_5$.

Another embodiment of the disclosure is the optical fiber described above, wherein the third cladding region comprises fluorine doped silica.

Another embodiment of the disclosure is the optical fiber described above, wherein the third cladding region consists essentially of fluorine doped silica and chlorine doped silica.

Another embodiment of the disclosure is the optical fiber described above, wherein the core comprises a chlorine concentration of greater than 1.3 wt %.

Another embodiment of the disclosure is the optical fiber described above, wherein the core comprises a chlorine concentration of greater than 2 wt %.

Another embodiment of the disclosure is the optical fiber described above, wherein the core comprises a chlorine concentration of greater than 3 wt %.

Another embodiment of the disclosure is the optical fiber described above, wherein the outer cladding region is surrounded by an undoped silica outer layer.

Another embodiment of the disclosure is the optical fiber described above, wherein $0.1\% \leq \Delta_{1max} \leq 0.5\%$.

Another embodiment of the disclosure is the optical fiber described above, wherein $-0.35\% \leq \Delta_{2min} \leq 0.05\%$.

Another embodiment of the disclosure is the optical fiber described above, wherein $-0.3\% \leq \Delta_4 \leq 0\%$.

Another embodiment of the disclosure is the optical fiber described above, wherein the attenuation at 1550 nm is $\leq 0.17$ dB/km.

Another embodiment of the disclosure is the optical fiber described above, wherein the bend loss at 1550 nm for a 30 mm mandrel of $\leq 0.005$ dB/turn.

Another embodiment of the disclosure is the optical fiber described above, wherein the core radius $r_1$ such that 3.5 microns$\leq r_1 \leq 5.5$ microns; and $0.1\% \leq \Delta_{1max} \leq 0.4\%$; the inner cladding region comprises an outer radius $r_2$ and 5 microns$\leq r_2 \leq 20$ microns; $-0.35\% \leq \Delta_{2min} \leq 0\%$.

Another embodiment of the disclosure is the optical fiber described above, wherein the inner cladding region comprises a moat volume between 1 $\Delta$ %-micron$^2$ and 12 $\Delta$ %-micron$^2$.

Another embodiment of the disclosure is the optical fiber described above, wherein the bend loss at 1550 nm for a 20 mm mandrel of less than 0.3 dB/turn.

Another embodiment of the disclosure is the optical fiber described above, wherein MFD at 1310 nm is between 9 microns and 9.5 microns.

Another embodiment of the disclosure is the optical fiber described above, wherein the inner cladding comprises a Trench Slope (TS), d$\Delta_2$/dr of 0.005% $\Delta$/micron<d$\Delta_2$/dr<0.2% $\Delta$/micron.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
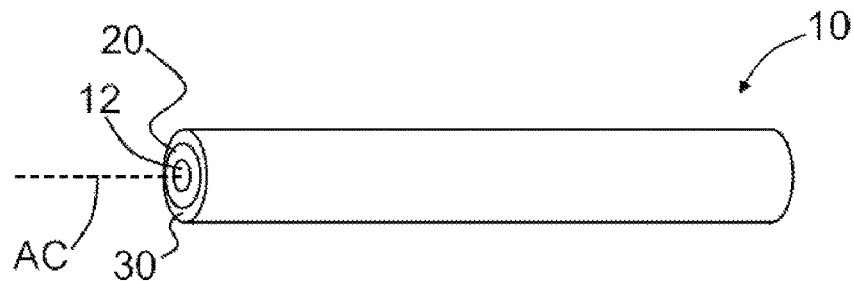
FIG. 1 is a side view of an example optical fiber as disclosed herein.

Additional features and advantages will be set forth in the detailed description which follows and will be apparent to those skilled in the art from the description or recognized by practicing as described in the following description together with the claims and appended drawings.

Low attenuation and low bend loss are critical properties in optical fibers. Optical fibers disclosed herein are valuable for use as low attenuation optical fibers in optical fiber cables for submarine and terrestrial long haul systems.

Definitions

The refractive index is denoted herein by n.

Attenuation is measured in decibels or dB and is abbreviated as "Attn" in the Tables.

The term "optical fiber" is also referred to as "fiber" herein.

The "relative refractive index profile" is the relationship between the relative refractive index Δ (defined below) and waveguide fiber radius, which is denoted r.

The radius r for each segment of a relative refractive index profile is given by the abbreviations $r_1$, $r_2$, $r_3$, $r_4$, etc.

Unless stated otherwise, the "relative refractive index percent" is defined as $\Delta\% = 100 \times (n_i^2 - n_c^2)/2n_i^2$, and as used herein $n_c$ is the average refractive index of undoped silica glass. As used herein, the relative refractive index is represented by Δ and its values are given in units of "%", unless otherwise specified. The terms: delta, Δ, Δ %, % Δ, delta %, refractive index delta, % delta, percent delta, relative refractive index or index may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and $B_2O_3$.

As described herein, while the relative refractive index of the optical profiles are calculated where index of $n_c$ is undoped silica, the entire index profile of the optical fiber can be shifted linearly up (or down) in order to obtain equivalent optical fiber properties.

"Chromatic dispersion," herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

The "Effective area" is defined as:

$$A_{eff} = 2\pi (\int f^2 r\, dr)^2 / (\int f^4 r\, dr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a relative refractive index profile, expressed in terms of Δ(r) which is in units of "%", where r is radius, which follows the equation, $$\Delta(r) = \Delta(r_o)(1 - [|r - r_o|/(r_1 - r_o)]^\alpha),$$

where $r_o$ is the point at which Δ(r) is maximum, $r_1$ is the point at which Δ(r) % is zero, and r is in the range $r_i \leq r \leq r_f$, where Δ is defined above, $r_i$ is the initial point of the α-profile, $r_f$ is the final point of the α-profile, and α is an exponent which is a real number and is called the "alpha value" or the ". In the discussion below, example values of α are provided for the above equation for Δ(r). In the discussion below, the alpha value or the "α-value" or just "α" or "alpha." Also in the discussion below, the alpha value for the second cladding region 21b is denoted as $\alpha_{T21a}$ and is referred to as the "moat alpha."

The mode field diameter (MFD) is measured using the Peterman II method wherein, 2w=MFD, and $$w = \left[ 2 \frac{\int_0^\infty (f(r))^2 r\, dr}{\int_0^\infty \left(\frac{df(r)}{dr}\right)^2 r\, dr} \right]^{1/2}.$$

The terms "μm" and "microns" can be used interchangeably herein.

The terms "moat" and "trench" can be used interchangeably herein and refers to a cladding region that has a minimum relative refractive index that is lower than that of the adjacent regions that are in contact therewith. The moat volume V is defined herein as $$V = 2 \int \Delta_{5-2}(r) r\, dr$$

wherein $\Delta_{5-2}(r) = \Delta_5 - \Delta_2(r)$ for a given radial position r situated between the radial positions of $r_1$ and $r_{2b}$, where $r_{2b}$ is the first radial location in region 21 moving radially outward from $r_1$ where the index Δ (at $r_{2b}$) is equal to $\Delta_5$. Thus, the limits of integration for V are from $r_1$ to $r_{2b}$.

The term "index slope" is defined as $TS = (\Delta_{MAX} - \Delta_{MIN})/(r_{OUTER} - r_{INNER})$ for the given region having inner and outer radii $r_{INNER}$ and $r_{OUTER}$. For the innermost cladding region 21, the term "trench slope" and "index slope" are used interchangeably, wherein the trench slope (i.e., the index slope) is denoted TS and is given by $TS = (\Delta_{2max} - \Delta_{2min})/(r_2 - r_1)$.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn. The bend loss or macrobend loss or microbend loss is generally abbreviated herein as BL and has units of dB/turn.

One type of bend test is the lateral load microbend test. In this so-called "lateral load" test (LLWM), a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is denoted $\lambda_0$ and is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2m fiber cutoff test, FOTP-80 (EIA-TIA-455-80), to yield the "fiber cutoff wavelength", also known as the "2m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" as used herein is denoted $\lambda_C$ and means the 22 m cabled cutoff test described in the EIA-445 Fiber Optic Test Procedures, which are part of the EIA-TIA Fiber Optics Standards, that is, the Electronics Industry Alliance-Telecommunications Industry Association Fiber Optics Standards.

Unless otherwise noted herein, optical properties (such as dispersion, dispersion slope, etc.) are reported for the LP01 mode.

In the discussion below, the term "surrounds" is used to describe the relative orientation of the different cylindrical or annular fiber regions, and the expression "A surrounds B" means that the inner surface of A resides radially beyond the outer surface of B, while the expression "A immediately surrounds B" means that the inner surface of A is in contact with the outer surface of B.

In the design Tables set forth below, all distance units (including the mode field diameter MFD) are in microns. All relative refractive index measurements Δ are "%". The moat volume is denoted V and is in units of "%-microns$^2$". All doping measurements are in units of wt %. Dispersion values are in units of ps/nm/km. All wavelength values are in nanometers (nm).

Optical Fiber

FIG. 1 is side view of optical fiber 10 as disclosed herein. The optical fiber 10 has a centerline AC and a radial coordinate r. The optical fiber 10 has a core 12 of radius $r_1$ surrounded by a cladding 20 having a maximum radius $r_5$. The outer radius of the optical fiber 10 is $r_{max}$. In an example, optical fiber 10 includes an optional undoped silica layer 30 that surrounds cladding 20, and in this fiber embodiment the outer radius of the layer $30=r_{max}$. In the embodiments that do not include the optional glass layer 30, $r_5=r_{1max}$.

The core 12 has a maximum index of $\Delta_{1max}$, an alpha of $\alpha \geq 10$, a maximum relative refractive index delta $\Delta_{1max}$, which in an example is in the range $0.1\% \leq \Delta_{1max} \leq 0.4\%$.

In an example, core 12 has radius $r_1$ in the range 3.5 microns $\leq r_1 \leq$ 5.5 microns.

In an example, core 12 is made of silica doped with Cl at a Cl concentration $\geq 0.9$ wt %. In another example, the Cl concentration $\geq 1.3$ wt %. In another example, the Cl concentration $\geq 2$ wt %. In another example, the Cl concentration $\geq 3$ wt %.

In example, optical fiber 10 also has a mode field diameter MFD at 1310 nm of larger than 9 microns and in an example is between 9 microns and 9.5 microns.

In another example, optical fiber 10 has a cable cutoff wavelength of less than 1260 nm, a zero dispersion wavelength between 1300 nm and 1324 nm and a bend loss at 1550 nm for a 20 mm mandrel of less than 0.5 dB/turn or less than 0.3 dB/turn.

In an example, optical fiber 10 also has an attenuation at 1550 nm is less than 0.17 dB/km.

In another example, the bend loss at 1550 nm for a 30 mm mandrel is less than 0.005 dB/turn.

In an example, the glass portion of the optical fiber 10 has an outer radius for of $r_{max}$=62.5 microns. If the optical fiber 10 does not include the optional layer 30, then $r_{max}$ is the outer radius of the cladding 20. If the optical fiber 10 comprises an optional silica layer 30 surrounding the cladding, then the outer radius of the glass layer 30 is $r_{max}$.

In examples, the alpha value $\alpha_{T21a}$ for second cladding region 21b (introduced and discussed below) is greater than 1, greater than or equal to 2, greater than or equal to 10 or greater than or equal to 20.

In examples, the trench slope $TS=(\Delta_{2max}-\Delta_{2min})/(r_2-r_1)$ is in the range from 0.005 to 0.5 or is in the range from 0.01 to 0.2, or is in the range from 0.01 to 0.11, or is in the range from 0.01 to 0.04, or is in the range from 0.01 to 0.02, or is in the range from 0.01 to 0.1, while in another embodiment is greater than zero, or is greater than zero and less than 1.

The optical fiber 10 has a number of other features as set forth in the first and second embodiments discussed below.

First Embodiment

Figure 2A:
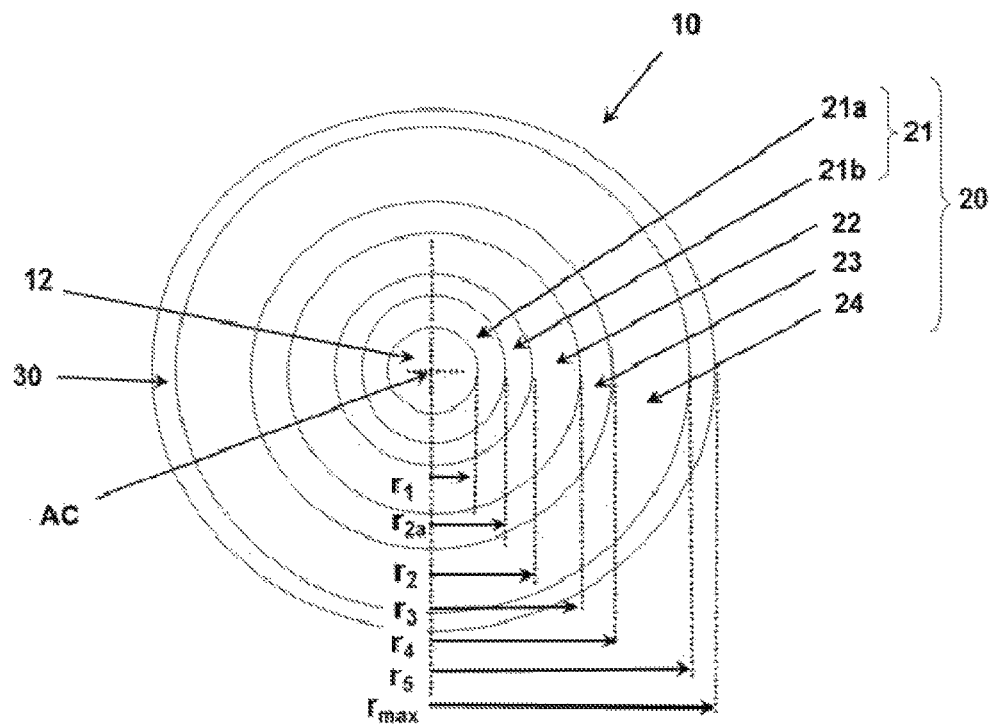
FIG. 2A is a schematic cross-sectional diagram of a first embodiment of the optical fiber of FIG. 1.
Figure 2B:
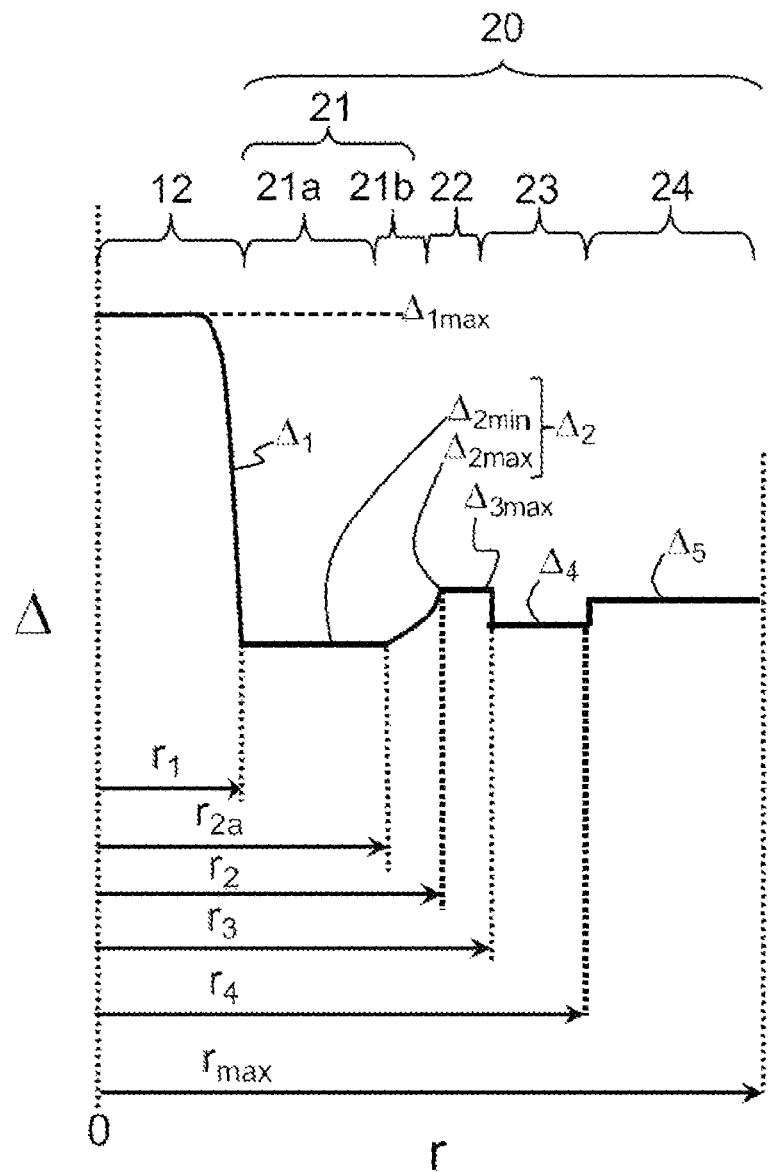
FIG. 2B is a plot of the relative refractive index profile Δ of the optical fiber of FIG. 2A.

FIG. 2A is a schematic cross-sectional diagram of a first embodiment of optical fiber 10. FIG. 2B is a plot of the relative refractive index profile ("index profile") Δ versus radius r for the optical fiber 10 of FIG. 2A, except the fiber embodiment of FIG. 2B does not include the optional a silica layer 30.

The cladding 20 of the first embodiment of optical fiber 10 includes five regions that progress outwardly from the core 12 in the following order: a first cladding region 21a of radius $r_{2a}$ and index $\Delta_{2min}$; a second cladding region 21b of radius $r_2$ and an index $\Delta_2$ that transitions from $\Delta_{2min}$ to $\Delta_{3max}$ and that has an index slope $d\Delta_2/dr \geq 0$; a third cladding region 22 of radius $r_3$ and index $\Delta_{3max}$; a fourth cladding region 23 of radius $r_4$ with an index $\Delta_4$; and a fifth and outermost cladding region 24 of radius $r_5$ and an index $\Delta_5$, wherein $\Delta_{2min}<\Delta_5<\Delta_{2max}$ and $\Delta_4<\Delta_5$. If the optical fiber 10 does not include the optional layer 30, then $r_5=r_{max}$. If the optical fiber 10 comprises an optional silica layer 30 surrounding the cladding, as shown in FIG. 2A, then the outermost radius of the glass layer 30 is $r_{max}$.

Adjacent cladding regions are in contact with one another while the first region 21a is in contact with core 12. The first and second regions 21a and 21b of cladding 20 constitute an innermost cladding region 21.

In an example, $0.1\% \leq \Delta_{1max} \leq 0.5\%$.

In another example, $-0.35\% \leq \Delta_{2min} \leq 0.05\%$.

In an example, the second cladding region 21b of cladding 20 has an outer radius $r_2$ in the range 5 microns$\leq r_2 \leq 13$ microns and $\Delta_{2min}$ is in the range $-0.35 \leq \Delta_{2min} < 0\%$.

In another example, $\Delta_4$ is between $-0.3\% \leq \Delta_{1max} \leq 0\%$.

The Table 1 below sets forth six examples (Ex. 1 through Ex. 6) for the first embodiment of optical fiber 10. In the Tables, "na" stands for "not applicable."

In example, the second cladding region 21b comprises the aforementioned refractive index delta $\Delta_2$ and has a minimum refractive index delta $\Delta_{2min}$ at radius $r_{2a}$ and maximum refractive index delta $\Delta_{2max}$ at radius $r_2$ such that $\Delta_{2min}<\Delta_{2max}<\Delta_{1max}$, while also comprising an index slope $TS>0$ or in one of the ranges as set forth above.

TABLE 1

| Parameter | Ex. 1 | Ex. 2 | Ex. 3 | Ex. 4 | Ex. 5 | Ex. 6 |
| --- | --- | --- | --- | --- | --- | --- |
| Core $\Delta_1$max, % | 0.17 | 0.154 | 0.08 | 0.125 | 0.125 | 0.30 |
| $r_1$, microns | 4.35 | 4.34 | 4.3 | 4.3 | 4.3 | 4.4 |
| Core $\alpha$, $\alpha_{core}$ | 20 | 20 | 20 | 20 | 20 | 20 |
| Core dopant | Cl | Cl | Cl | Cl | Cl | Cl |
| Cl in core, wt. % | 2.05 | 1.86 | 0.96 | 1.51 | 1.51 | 3.61 |
| $\Delta_{2min}$, % | −0.20 | −0.22 | −0.27 | −0.25 | −0.27 | −0.10 |
| $r_{2a}$, microns | 6 | 5 | 4.8 | 5 | na | na |
| α cladding section 21a, $\alpha_{T21a}$ | 20 | 20 | 20 | 20 | na | na |
| $\Delta_{2max}$, % | −0.08 | −0.13 | −0.195 | −0.13 | −0.18 | 0 |
| $r_2$, microns | 8 | 8 | 9 | 10 | 7 | 8 |
| $r_2 - r_1$, microns | 3.65 | 3.66 | 4.70 | 5.70 | 2.70 | 3.60 |
| TS = $(\Delta_{2max} - \Delta_{2min})/(r_2 - r_1)$, %/micron | 0.032 | 0.025 | 0.017 | 0.022 | 0.035 | 0.028 |
| α cladding section 21b, $\alpha_{T21b}$ | 2 | 2 | 2 | 2 | 2 | 2 |
| Dopant cladding section 21 | F | F | F | F | F | F |
| F for $\Delta_{2min}$, wt. % | 0.70 | 0.79 | 0.98 | 0.91 | 0.98 | 0.36 |
| V cladding section 21, % delta · microns² | 4.0 | 2.8 | 3.2 | 6.5 | 1.8 | 2.7 |
| $\Delta_3$, % | −0.08 | −0.20 | −0.26 | −0.25 | −0.27 | −0.08 |
| $r_3$, microns | 8 | 10 | 11 | 12 | 13 | 12.2 |
| α cladding section 22, $\alpha_{T22}$ | 200 | 200 | 200 | 200 | 200 | 200 |
| Dopant Cladding section 22 | F | F | F | F | F | F |
| $\Delta_5$, % | −0.17 | −0.20 | −0.26 | −0.22 | −0.24 | −0.06 |
| F for $\Delta_5$, wt. % | 0.61 | 0.70 | 0.93 | 0.80 | 0.86 | 0.22 |
| $r_4$, microns | 9.5 | 15 | 13 | 14 | 15 | 16 |
| $r_{max}$, microns | 62.5 | 62.5 | 62.5 | 62.5 | 62.5 | 62.5 |
| Dispersion at 1310 nm, (ps/nm/km) | −0.04 | 0.11 | 0.28 | 0.31 | 0.16 | 0.12 |
| Dispersion Slope at 1310 nm, (ps/nm²/km) | 0.083 | 0.083 | 0.083 | 0.082 | 0.083 | 0.084 |
| Dispersion at 1550 nm, (ps/nm/km) | 16.5 | 16.6 | 16.7 | 16.4 | 16.8 | 16.8 |
| Dispersion at Slope 1550 nm, (ps/nm²/km) | 0.057 | 0.057 | 0.057 | 0.055 | 0.057 | 0.057 |
| MFD at 1310 nm, microns | 9.2 | 9.1 | 9.2 | 9.0 | 9.1 | 9.0 |
| MFD at 1550 nm, microns | 10.6 | 10.4 | 10.6 | 10.3 | 10.3 | 10.3 |
| LLWM @ 1550 nm, dB/m | 0.78 | 0.61 | 0.81 | 0.67 | 0.39 | 0.34 |
| WMCD at 1550 nm, dB/km | 0.05 | 0.05 | 0.05 | 0.05 | 0.05 | 0.05 |
| Pin Array at 1550 nm, dB | 9.3 | 7.2 | 10.0 | 8.5 | 4.3 | 4.1 |
| Zero dispersion wavelength, $\lambda_0$, nm | 1310 | 1309 | 1307 | 1306 | 1308 | 1309 |

TABLE 1-continued

| Parameter | Ex. 1 | Ex. 2 | Ex. 3 | Ex. 4 | Ex. 5 | Ex. 6 |
|---|---|---|---|---|---|---|
| 22 m Cable Cutoff, $\lambda_C$, nm | 1189 | 1199 | 1178 | 1191 | 1218 | 1198 |
| MAC # (MFD at 1310 nm/Cable Cutoff) | 7.76 | 7.62 | 7.84 | 7.59 | 7.44 | 7.55 |
| 1 × 20 mm BL, dB/turn | 0.317 | 0.306 | 0.305 | 0.300 | 0.271 | 0.295 |
| 1 × 30 mm BL, dB/turn | 0.0052 | 0.0038 | 0.0060 | 0.0044 | 0.0032 | 0.0023 |
| Attn at 1550 nm, dB/km | 0.17 | 0.17 | 0.17 | 0.17 | 0.17 | 0.17 |
| Attn at 1310 nm, dB/km | 0.31 | 0.31 | 0.31 | 0.31 | 0.31 | 0.31 |

In an example, first cladding region 21a comprises fluorine doped silica while in another example the first cladding region consists of fluorine doped silica while in yet another example the first cladding region consists essentially of fluorine doped silica and chlorine-doped silica.

Also in an example, the third cladding region 22 comprises fluorine doped silica while in another example the first cladding region consists of fluorine doped silica and chlorine doped silica.

In an example, there may be 500 ppm to 2000 ppm of Cl in the silica of the given region. This may arise for example during the drying step when manufacturing the fiber. In other cases, this may arise due to intentional co-doping with F and Cl in the first and/or third cladding region.

In an example, the innermost cladding region 21 has a moat volume between 1 Δ %·micron$^2$ and 12 Δ %·micron$^2$. In another example, the innermost cladding region 21 has a moat volume V between 3 Δ %·micron$^2$ and 9 Δ %·micron$^2$. In another example, the innermost cladding region 21 has a moat volume V between 3 Δ %·micron$^2$ and 8 Δ %·micron$^2$. In another example, the innermost cladding region 21 has a moat volume V between 3 Δ %·micron$^2$ and 7 Δ %·micron$^2$.

In example, the radial width of second cladding region 21b, which is given by $r_2-r_{2a}$, is in the range from 0 to 5 microns or in the range from 1 micron to 5 microns or in the range from 2 microns to 4 microns.

Second Embodiment of Optical Fiber and Examples

Figure 3A:
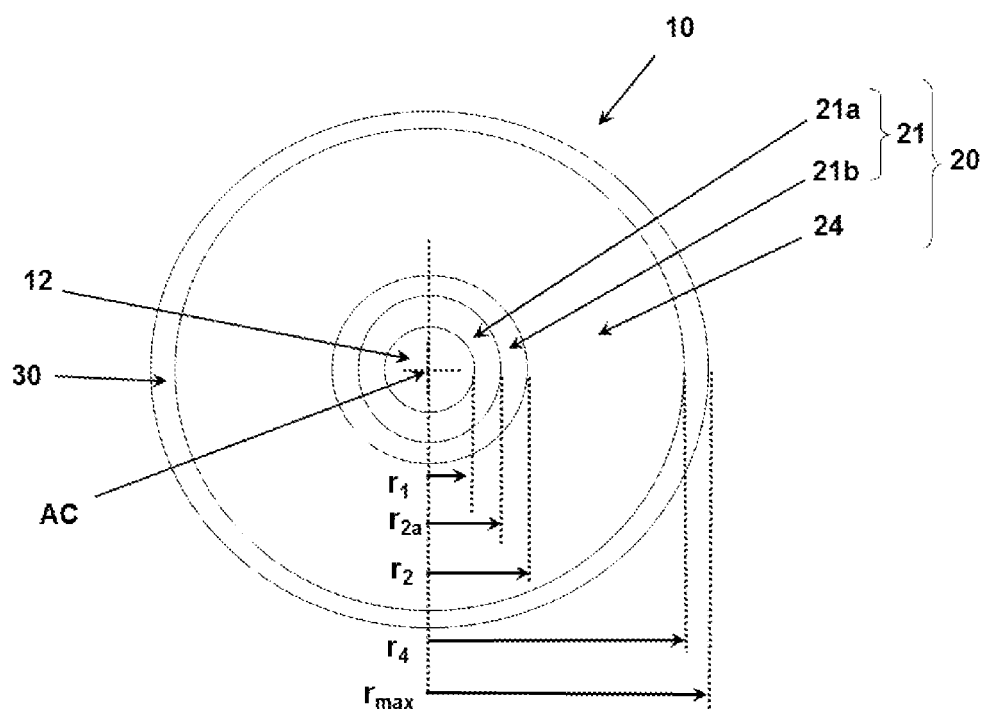
FIG. 3A is a schematic cross-sectional diagram of a second embodiment of the optical fiber of FIG. 1.
Figure 3B:
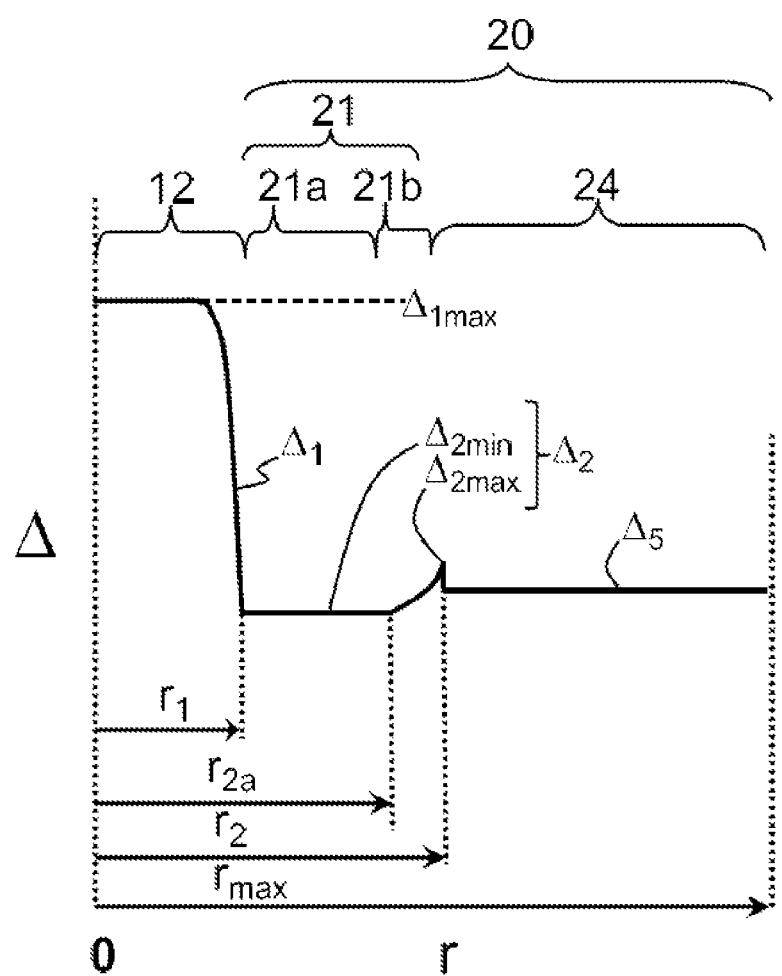
FIG. 3B is a plot of the relative refractive index profile Δ of the optical fiber of FIG. 3A.

FIG. 3A is a schematic cross-sectional diagram of a second embodiment of optical fiber 10. FIG. 3B is a plot of the index profile Δ versus radius r for the optical fiber 10 of FIG. 3B.

The cladding 20 of first example optical fiber 10 includes three regions that progress outwardly from the core in the following order: a first and innermost cladding region 21a of radius $r_{2a}$ and index $\Delta_{2min}$, a second cladding region 21b of radius $r_2$ and a third cladding region 24 of index $\Delta_5$. The first and second cladding regions 21a and 21b constitute an innermost cladding region 21.

In an example, index $\Delta_2$ transitions from $\Delta_{2min}$ to $\Delta_{3max}$ and has an index slope TS≥0. Also in an example, $\Delta_{2min}<\Delta_5<\Delta_{2max}$ and $\Delta_5<\Delta_{3max}$.

Adjacent cladding regions are in contact with one another while the first region 21a is in contact with core 12.

In an example, $0.1\%\leq\Delta_{1max}\leq0.5\%$.

In another example, $-0.35\%\leq\Delta_{2min}\leq0.05\%$.

In an example, the second cladding region 21b has an outer radius $r_2$ in the range 5 microns≤$r_2$≤13 microns and $\Delta_{2min}$ is in the range $-0.35\%\leq\Delta_{2min}<0\%$.

The second embodiment of optical fiber 10 is similar to the first embodiment but omits cladding regions 22 and 23.

In example, the second cladding region 21b comprises the aforementioned refractive index delta $\Delta_2$ and has a minimum refractive index delta $\Delta_{2min}$ at radius $r_{2a}$ and maximum refractive index delta $\Delta_{2max}$ at radius $r_2$ such that $\Delta_{2min}<\Delta_{2max}<\Delta_{1max}$, while also comprising an index slope TS>0 or in one of the ranges as set forth above.

Table 2 below sets forth six examples Ex. 7 through Ex. 13 for first example optical fiber 10.

TABLE 2

| Parameter | Ex. 7 | Ex. 8 | Ex. 9 | Ex. 10 | Ex. 11 | Ex. 12 | Ex. 13 |
|---|---|---|---|---|---|---|---|
| Core, $\Delta_{1max}$, % | 0.37 | 0.36 | 0.355 | 0.165 | 0.36 | 0.38 | 0.39 |
| $r_1$, microns | 4.5 | 4.4 | 4.25 | 4.3 | 4.45 | 4.55 | 4.59 |
| Core α, $\alpha_{core}$ | 20 | 20 | 20 | 20 | 20 | 20 | 20 |
| Core dopant | Cl | Cl | Cl | Cl | Cl | Cl | Cl |
| Cl in core, wt. % | 4.46 | 4.34 | 4.28 | 1.99 | 4.34 | 4.58 | 4.73 |
| $\Delta_{2min}$, % | 0.00 | 0.00 | 0.00 | −0.20 | 0 | 0 | 0 |
| $r_{2a}$, microns | 8 | 8 | 8 | na | 5.5 | 5.5 | 5.56 |
| α cladding section 21a, $\alpha_{T21a}$ | 20 | 20 | 20 | na | 2000 | 2000 | 2000 |
| $\Delta_{2max}$, % | 0.05 | 0.075 | 0.03 | −0.11 | 0.1 | 0.1 | 0.1 |
| $r_2$, microns | 8 | 8 | 8 | 10 | 5.5 | 5.5 | 5.56 |
| $r_2 - r_1$, microns | 3.50 | 3.60 | 3.75 | 5.70 | 1.05 | 0.95 | 0.98 |
| TS = $(\Delta_{2max} - \Delta_{2min})/(r_2 - r_1)$, %/micron | 0.014 | 0.021 | 0.008 | 0.016 | 0.095 | 0.105 | 0.103 |
| α of cladding section 21b, $\alpha_{T21b}$ | 20 | 2 | 2 | 2 | 2000 | 2000 | 2000 |
| Dopant cladding section 21 | none | none | F | F | none | none | none |
| F for $\Delta_{2min}$, wt. % | 0.00 | 0.00 | 0.00 | 0.73 | 0 | 0 | 0 |
| V cladding region 21, % delta · microns$^2$ | 2.1 | 3.1 | 1.3 | 4.5 | 1.1 | 1.0 | 1.0 |
| $\Delta_3$, % | 0.05 | 0.075 | 0.03 | −0.11 | 0.1 | 0.1 | 0.1 |
| $r_3$, microns | 8 | 8 | 8 | 10 | 5.5 | 5.5 | 5.56 |
| α cladding section 24, $\alpha_{T24}$ | 200 | 2 | 2 | 2 | 20 | 20 | 20 |

TABLE 2-continued

| Parameter | Ex. 7 | Ex. 8 | Ex. 9 | Ex. 10 | Ex. 11 | Ex. 12 | Ex. 13 |
|---|---|---|---|---|---|---|---|
| Dopant cladding section 24 | Cl | Cl | Cl | F | Cl | Cl | Cl |
| $\Delta_5$, % | 0.02 | 0.02 | 0.00 | −0.20 | 0 | 0.03 | 0.03 |
| F for $\Delta_5$, wt. % | −0.07 | −0.07 | 0.00 | 0.70 | 0 | 0 | 0 |
| $r_4$, microns | 12 | 12 | 12 | 10 | 6.52 | 6.52 | 6.52 |
| $r_{max}$, % | 62.5 | 62.5 | 62.5 | 62.5 | 62.5 | 62.5 | 62.5 |
| Dispersion at 1310 nm (ps/nm/km) | 0.52 | −0.10 | −0.21 | 0.16 | −0.201 | −0.189 | 0.056 |
| Dispersion Slope at 1310 nm, (ps/nm²/km) | 0.086 | 0.085 | 0.085 | 0.084 | 0.088 | 0.087 | 0.087 |
| Dispersion at 1550 nm, (ps/nm/km) | 17.4 | 16.6 | 16.6 | 17.0 | 17.2 | 17.1 | 17.3 |
| Dispersion at Slope 1550 nm, (ps/nm²/km) | 0.057 | 0.057 | 0.057 | 0.057 | 0.060 | 0.059 | 0.059 |
| MFD at 1310 nm, microns | 9.2 | 9.2 | 9.1 | 9.1 | 9.2 | 9.2 | 9.1 |
| MFD at 1550 nm, microns | 10.3 | 10.4 | 10.3 | 10.3 | 10.4 | 10.4 | 10.3 |
| LLWM @ 1550 nm, dB/m | 0.37 | 0.64 | 0.45 | 0.40 | 0.35 | 0.43 | 0.27 |
| WMCD at 1550 nm, dB/km | 0.05 | 0.05 | 0.05 | 0.05 | 0.05 | 0.05 | 0.05 |
| Pin Array at 1550 nm, dB | 4.5 | 8.0 | 5.7 | 4.7 | 4.2 | 5.8 | 3.5 |
| Zero dispersion wavelength, $\lambda_0$, nm | 1304 | 1311 | 1312 | 1308 | 1312 | 1312 | 1309 |
| 22 m Cable Cutoff, $\lambda_C$, nm | 1201 | 1190 | 1184 | 1208 | 1224 | 1184 | 1214 |
| MAC # (MFD at 1310 nm/Cable Cutoff) | 7.63 | 7.72 | 7.65 | 7.52 | 7.52 | 7.77 | 7.49 |
| 1 × 20 mm BL, dB/turn | 0.277 | 0.331 | 0.274 | 0.253 | 0.330 | 0.440 | 0.390 |
| 1 × 30 mm BL, dB/turn | 0.0031 | 0.0057 | 0.0039 | 0.0032 | 0.0036 | 0.0042 | 0.0037 |
| Attn at 1550 nm, dB/km | 0.17 | 0.17 | 0.17 | 0.17 | 0.17 | 0.17 | 0.17 |
| Attn at 1310 nm, dB/km | 0.31 | 0.31 | 0.31 | 0.31 | 0.31 | 0.31 | 0.31 |

In an example, first cladding region 21a comprises fluorine doped silica while in another example the first cladding region consists of fluorine doped silica.

In an example, the innermost cladding region 21 has a moat volume V between 1 Δ %·micron² and 12 Δ %·micron². In another example, the innermost cladding region 21 has a moat volume V between 3 Δ %·micron and 9 Δ %·micron². In another example, the innermost cladding region 21 has a moat volume V between 3 Δ %·micron² and 8 Δ %·micron.

In an example based on the example optical fibers 10 of Table 2, the radial width w of second cladding region 21b, which is given by w=$r_2$−$r_{2a}$, is zero.

In some embodiments that comprise the inner cladding region 21a, the radial width w of second cladding region 21b (i.e., the width of the sloped portion of the inner most cladding region 21) is 0.1 microns≤($r_2$−$r_{2a}$)≤7 microns. In some of these embodiments, where the radial width w of second cladding region 21b is 1 microns≤($r_2$−$r_{2a}$)≤7 microns, and in some embodiments 2 microns≤($r_2$−$r_{2a}$)≤6 microns.

In some embodiments that do not have the inner cladding region 21a (i.e., where $r_1$=$r_{2a}$) the radial width w of second cladding region 21b is: 0.1 microns≤($r_2$−$r_1$)≤7 microns. In some of these embodiments, where the radial width w of second cladding region 21b is 1 microns≤($r_2$−$r_1$)≤7 microns, and in some embodiments 2 microns≤($r_2$−$r_1$)≤6 microns.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
   a. a chlorine doped silica core comprising a core alpha α≥10, a core radius $r_1$ and maximum refractive index delta $\Delta_{1max}$ % and Cl concentration≥0.9 wt %;
   b. a cladding surrounding the core, the cladding comprising:
      a. an inner cladding region immediately surrounding the core and comprising first and second cladding regions with respective outer radii $r_{2a}$ and $r_2$ where $r_{2a}$<$r_2$, the second cladding region comprising a refractive index delta $\Delta_2$ with a minimum refractive index delta $\Delta_{2min}$ at radius $r_{2a}$ and maximum refractive index delta $\Delta_{2max}$ at radius $r_2$ such that $\Delta_{2min}$<$\Delta_{2max}$<$\Delta_{1max}$, and comprising an index slope TS=($\Delta_{2max}$−$\Delta_{2min}$)/($r_2$−$r_1$)>0;
      b. an outer cladding region surrounding the first inner cladding region and comprising an outer radius $r_{max}$ and refractive index delta $\Delta_5$, such that $\Delta_{2min}$<$\Delta_5$<$\Delta_{2max}$
   c. wherein the optical fiber comprises a mode field diameter MFD at 1310 nm of larger than 9 microns, a cable cutoff wavelength of ≤1260 nm, zero dispersion wavelength $\lambda_0$, where 1300 nm≤$\lambda_0$≤1324 nm and bend loss at 1550 nm for a 20 mm mandrel of less than 0.5 dB/turn; and
   d. said optical fiber having a core radius $r_1$ such that 3.5 microns≤$r_1$≤5.5 microns and 0.1%≤$\Delta_{1max}$≤0.4%; and wherein the inner cladding region comprises an outer radius $r_2$ such that 5 microns≤$r_2$≤20 microns and −0.35%≤$\Delta_{2min}$<0%.

2. The optical fiber of claim 1, where the first cladding region comprises fluorine doped silica.

3. The optical fiber of claim 2, wherein the first cladding region consists essentially of fluorine doped silica and chlorine doped silica.

4. The optical fiber of claim 1, wherein the cladding further comprises a third cladding region immediately surrounding the second cladding region and comprising a refractive index delta $\Delta_3$ and a maximum refractive index delta $\Delta_{3max}$ such that $\Delta_5$<$\Delta_{3max}$.

5. The optical fiber of claim 4, the cladding further comprises a fourth cladding region immediately surrounding the third cladding region and comprising a refractive index delta $\Delta_4$ and a minimum refractive index delta $\Delta_4$ such that $\Delta_4 < \Delta_5$.

6. The optical fiber of claim 4, wherein the third cladding region comprises fluorine doped silica.

7. The optical fiber of claim 6, wherein the third cladding region consists essentially of fluorine doped silica and chlorine doped silica.

8. The optical fiber of claim 1, wherein the core comprises a chlorine concentration of greater than 1.3 wt %.

9. The optical fiber of claim 8, wherein the core comprises a chlorine concentration of greater than 2 wt %.

10. The optical fiber of claim 9, wherein the core comprises a chlorine concentration of greater than 3 wt %.

11. The optical fiber of claim 1, wherein the outer cladding region is surrounded by an undoped silica outer layer.

12. The optical fiber of claim 1, wherein $0.1\% \leq \Delta_{1max} \leq 0.5\%$.

13. The optical fiber of claim 1, wherein $-0.35\% \leq \Delta_{2min} \leq 0.05\%$.

14. The optical fiber of claim 5, wherein $-0.3\% \leq \Delta_4 \leq 0\%$.

15. The optical fiber of claim 1, wherein the attenuation at 1550 nm is $\leq 0.17$ dB/km.

16. The optical fiber of claim 1, also having a bend loss at 1550 nm for a 30 mm mandrel of $\leq 0.005$ dB/turn.

17. The optical fiber of claim 2, wherein the inner cladding region comprises a moat volume between 1 $\Delta$ %-micron$^2$ and 12 $\Delta$ %-micron$^2$.

18. The optical fiber of claim 1, wherein the bend loss at 1550 nm for a 20 mm mandrel is less than 0.3 dB/turn.

19. The optical fiber of claim 1, wherein MFD at 1310 nm is between 9 microns and 9.5 microns.

20. The optical fiber according to claim 1, wherein:

$$0.005\% \ \Delta/\text{micron} < d\Delta_2/dr < 0.2\% \ \Delta/\text{micron}.$$

* * * * *